United States Patent
Kim et al.

(10) Patent No.: US 10,311,336 B1
(45) Date of Patent: Jun. 4, 2019

(54) METHOD AND DEVICE OF NEURAL NETWORK OPERATIONS USING A GRID GENERATOR FOR CONVERTING MODES ACCORDING TO CLASSES OF AREAS TO SATISFY LEVEL 4 OF AUTONOMOUS VEHICLES

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang (KR)

( * ) Notice: Subject to any disclaimer, the term of this patent is extended or adjusted under 35 U.S.C. 154(b) by 0 days.

(21) Appl. No.: 16/254,525

(22) Filed: Jan. 22, 2019

(51) Int. Cl.
*G06K 9/62* (2006.01)
*G06N 3/08* (2006.01)
(Continued)

(52) U.S. Cl.
CPC ....... *G06K 9/6261* (2013.01); *G06K 9/00791* (2013.01); *G06K 9/628* (2013.01); *G06K 9/6256* (2013.01); *G06K 9/6262* (2013.01); *G06N 3/04* (2013.01); *G06N 3/08* (2013.01); *G06T 7/70* (2017.01); *G06T 2207/20081* (2013.01);
(Continued)

(58) Field of Classification Search
CPC ............ G06K 9/6261; G06K 9/00791; G06K 9/6256; G06K 9/6262; G06K 9/628; G06T 7/70; G06T 2207/20081; G06T 2207/20084; G06T 2207/30252; G06N 3/04; G06N 3/08
See application file for complete search history.

(56) References Cited

U.S. PATENT DOCUMENTS

| | | | | | |
|---|---|---|---|---|---|
| 5,448,484 | A | * | 9/1995 | Bullock | G08G 1/04 340/933 |
| 5,640,468 | A | * | 6/1997 | Hsu | G06K 9/00201 382/190 |

(Continued)

*Primary Examiner* — Manav Seth
(74) *Attorney, Agent, or Firm* — Xsensus, LLP

(57) ABSTRACT

A method of neural network operations by using a grid generator is provided for converting modes according to classes of areas to satisfy level 4 of autonomous vehicles. The method includes steps of: (a) a computing device instructing a pair detector to acquire information on locations and classes of pairs for testing by detecting the pairs for testing; (b) the computing device instructing the grid generator to generate section information by referring to the information on the locations of the pairs for testing; (c) the computing device instructing a neural network to determine parameters for testing by referring to parameters for training which have been learned by using information on pairs for training; and (d) the computing device instructing the neural network to apply the neural network operations to a test image by using each of the parameters for testing to thereby generate one or more neural network outputs.

20 Claims, 5 Drawing Sheets

(51) Int. Cl.
*G06N 3/04* (2006.01)
*G06T 7/70* (2017.01)
*G06K 9/00* (2006.01)

(52) U.S. Cl.
CPC ............... *G06T 2207/20084* (2013.01); *G06T 2207/30252* (2013.01)

(56) References Cited

U.S. PATENT DOCUMENTS

| | | | | |
|---|---|---|---|---|
| 7,398,259 | B2* | 7/2008 | Nugent | G06N 3/08 |
| | | | | 706/33 |
| 7,958,063 | B2* | 6/2011 | Long | G06K 9/00147 |
| | | | | 706/12 |
| 9,576,201 | B2* | 2/2017 | Wu | G06K 9/00664 |
| 9,760,806 | B1* | 9/2017 | Ning | B60W 50/14 |
| 9,805,293 | B2* | 10/2017 | Zheng | G06T 7/11 |
| 9,836,839 | B2* | 12/2017 | Champlin | G06T 7/0012 |
| 9,881,234 | B2* | 1/2018 | Huang | G06K 9/6232 |
| 9,904,849 | B2* | 2/2018 | Estrada | G06N 3/04 |
| 10,013,773 | B1* | 7/2018 | Ogale | G06K 9/00791 |
| 10,108,850 | B1* | 10/2018 | Das | G06K 9/00288 |
| 10,140,553 | B1* | 11/2018 | Vasisht | G06K 9/6267 |
| 10,176,388 | B1* | 1/2019 | Ghafarianzadeh | |
| | | | | G06K 9/00671 |
| 2005/0175243 | A1* | 8/2005 | Luo | G06K 9/00362 |
| | | | | 382/224 |
| 2014/0270350 | A1* | 9/2014 | Rodriguez-Serrano | |
| | | | | G06K 9/6217 |
| | | | | 382/103 |
| 2014/0294239 | A1* | 10/2014 | Duckett | G06K 9/6228 |
| | | | | 382/103 |
| 2019/0072977 | A1* | 3/2019 | Jeon | G06K 9/00791 |

* cited by examiner

METHOD AND DEVICE OF NEURAL NETWORK OPERATIONS USING A GRID GENERATOR FOR CONVERTING MODES ACCORDING TO CLASSES OF AREAS TO SATISFY LEVEL 4 OF AUTONOMOUS VEHICLES

FIELD OF THE DISCLOSURE

The present disclosure relates to a method of neural network operations using a grid generator for converting modes according to classes of areas in a test image to satisfy level 4 of autonomous vehicles; and more particularly, the method for the neural network operations by using a grid generator, including steps of: (a) if the test image is acquired, instructing a pair detector to acquire information on locations and classes of one or more pairs for testing by detecting the pairs for testing, including objects for testing and non-objects for testing corresponding to the objects for testing, on the test image; (b) instructing the grid generator to generate section information, which includes information on a plurality of subsections in the test image, by referring to the information on the locations of the pairs for testing; (c) instructing a neural network to determine parameters for testing, to be used for applying the neural network operations to each of at least part of the subsections including each of the pairs for testing, by referring to parameters for training which have been learned by using information on pairs for training whose corresponding information on the classes is same as or similar to that on the pairs for testing; and (d) instructing the neural network to apply the neural network operations to the test image by using each of the parameters for testing, corresponding to each of said at least part of the subsections, to thereby generate one or more neural network outputs, and a computing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of the machine learning.

Meanwhile, also in the field of autonomous driving, the CNN is used widely. In autonomous driving circumstances, most of input images have a similar typical arrangement, mainly including roads in the centers of the input images and sidewalks in both sides of the input images. Thus, CNN for the autonomous driving may learn parameters by using training images with the typical arrangement, e.g., composition.

However, learning process as shown above has a critical shortcoming. That is, in case arrangements of the input images are not similar to those of the training images, CNN operations may be inefficient. For example, when rounding a corner, a road may not exist in the center of a test image, different from the training images with the typical arrangement. Because parameters of the CNN are optimized for the input images with the roads located in centers thereof, the test image may not be processed properly with the above-mentioned parameters.

SUMMARY OF THE DISCLOSURE

It is an object of the present disclosure to solve all the aforementioned problems.

It is another object of the present disclosure to provide a method for determining parameters for testing by referring to information on classes of one or more pairs for testing, including objects for testing and non-objects for testing, included in each of at least part of subsections, to thereby generate optimized neural network outputs.

In accordance with one aspect of the present disclosure, there is provided a method for neural network operations by using a grid generator, including steps of: (a) a computing device, if a test image is acquired, instructing a pair detector to acquire information on locations and classes of one or more pairs for testing by detecting the pairs for testing, including objects for testing and non-objects for testing corresponding to the objects for testing, on the test image; (b) the computing device instructing the grid generator to generate section information, which includes information on a plurality of subsections in the test image, by referring to the information on the locations of the pairs for testing; (c) the computing device instructing a neural network to determine parameters for testing, to be used for applying the neural network operations to each of at least part of the subsections including each of the pairs for testing, by referring to parameters for training which have been learned by using information on pairs for training whose corresponding information on the classes is same as or similar to that on the pairs for testing; and (d) the computing device instructing the neural network to apply the neural network operations to the test image by using each of the parameters for testing, corresponding to each of said at least part of the subsections, to thereby generate one or more neural network outputs.

As one example, at the step of (b), the grid generator divides the test image by using a dynamic template, and wherein the dynamic template is provided by adjusting one or more boundaries included therein, such that (i) at least one of the pairs for testing is included in each of said at least part of the subsections of the dynamic template.

As one example, the grid generator manages information on the dynamic template, and wherein the dynamic template includes at least part of (i) at least one first boundary in a first direction and (ii) at least one second boundary in a second direction, some of which are adjustable.

As one example, the dynamic template includes row groups and one or more column groups, wherein the row groups have an upper row group, a middle row group including at least part of the column groups, and a lower row group, and wherein (i) at least one of the pairs for testing is included in each of said at least part of the subsections formed by the row groups and the column groups.

As one example, before the step (a), the method further includes a step of: (a0) the computing device instructing the neural network to learn the parameters for training by using information on each of the pairs for training included in one or more training images.

As one example, at the step of (a0), the neural network learns the parameters for training by using information on each of the pairs for training included in each of at least part of partial areas, from a first partial area to a k-th partial area, included in the training images, and store information on classes of the pairs for training coupled with their corresponding parameters for training.

As one example, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

As one example, at the step of (c), (i) on condition that area of a specific object for testing is larger than that of a specific non-object for testing, which is included in a specific subsection along with the specific object for testing, the computing device determines a specific pair for testing, including the specific non-object for testing and the specific object for testing, as having first information on classes, and instructs the neural network to determine at least one specific parameter for testing among the parameters for testing, to be used for applying the neural network operations to the specific subsection, by referring to at least one first specific parameter for training among the parameters for training and (ii) on condition that the area of the specific object for testing is same as or smaller than that of the specific non-object, the computing device determines a specific pair for testing, including the specific non-object for testing and the specific object for testing, as having second class information on classes and instructs the neural network to determine at least one specific parameter for testing among the parameters for testing, to be used for applying the neural network operations to the specific subsection, by referring to at least one second specific parameter for training among the parameters for training.

As one example, at the step of (d), the computing device instructs the neural network to generate the neural network outputs by applying one or more convolutional operations and one or more deconvolutional operations to the test image with the parameters for testing.

As one example, the test image represents road driving circumstances, the objects for testing represent objects existing on a road, and the neural network outputs are used for autonomous driving.

In accordance with another aspect of the present disclosure, there is provided a computing device for neural network operations by using a grid generator, including: at least one memory that stores instructions; and at least one processor configured to execute the instructions to: perform processes of: (I) instructing a pair detector to acquire information on locations and classes of one or more pairs for testing by detecting the pairs for testing, including objects for testing and non-objects for testing corresponding to the objects for testing, on a test image, (II) instructing the grid generator to generate section information, which includes information on a plurality of subsections in the test image, by referring to the information on the locations of the pairs for testing, (III) instructing a neural network to determine parameters for testing, to be used for applying the neural network operations to each of at least part of the subsections including each of the pairs for testing, by referring to parameters for training which have been learned by using information on pairs for training whose corresponding information on the classes is same as or similar to that on the pairs for testing, and (IV) instructing the neural network to apply the neural network operations to the test image by using each of the parameters for testing, corresponding to each of said at least part of the subsections, to thereby generate one or more neural network outputs.

As one example, at the process of (II), the grid generator divides the test image by using a dynamic template, and wherein the dynamic template is provided by adjusting one or more boundaries included therein, such that (i) at least one of the pairs for testing is included in each of said at least part of the subsections of the dynamic template.

As one example, the grid generator manages information on the dynamic template, and wherein the dynamic template includes at least part of (i) at least one first boundary in a first direction and (ii) at least one second boundary in a second direction, some of which are adjustable.

As one example, the dynamic template includes row groups and one or more column groups, wherein the row groups have an upper row group, a middle row group including at least part of the column groups, and a lower row group, and wherein (i) at least one of the pairs for testing is included in each of said at least part of the subsections formed by the row groups and the column groups.

As one example, before the process (I), the processor further performs a process of: (0) instructing the neural network to learn the parameters for training by using information on each of the pairs for training included in one or more training images.

As one example, at the process of (0), the neural network learns the parameters for training by using information on each of the pairs for training included in each of at least part of partial areas, from a first partial area to a k-th partial area, included in the training images, and store information on classes of the pairs for training coupled with their corresponding parameters for training.

As one example, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

As one example, at the process of (III), (i) on condition that area of a specific object for testing is larger than that of a specific non-object for testing, which is included in a specific subsection along with the specific object for testing, the processor determines a specific pair for testing, including the specific non-object for testing and the specific object for testing, as having first information on classes, and instructs the neural network to determine at least one specific parameter for testing among the parameters for testing, to be used for applying the neural network operations to the specific subsection, by referring to at least one first specific parameter for training among the parameters for training and (ii) on condition that the area of the specific object for testing is same as or smaller than that of the specific non-object, the processor determines a specific pair for testing, including the specific non-object for testing and the specific object for testing, as having second class information on classes and instructs the neural network to determine at least one specific parameter for testing among the parameters for testing, to be used for applying the neural network operations to the specific subsection, by referring to at least one second specific parameter for training among the parameters for training.

As one example, at the process of (IV), the processor instructs the neural network to generate the neural network outputs by applying one or more convolutional operations and one or more deconvolutional operations to the test image with the parameters for testing.

As one example, the test image represents road driving circumstances, the objects for testing represent objects existing on a road, and the neural network outputs are used for autonomous driving.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
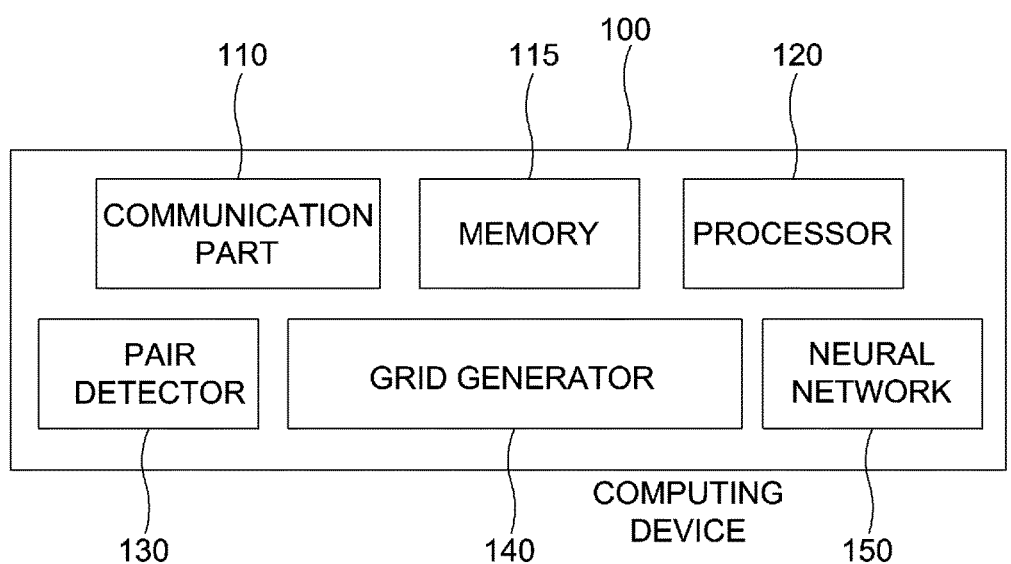
FIG. 1 shows a configuration of a computing device for performing a method of neural network operations using a grid generator in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

For reference, in the description below, the phrase "for training" is added for terms related to learning processes, and the phrase "for testing" is added for terms related to testing processes, to avoid possible confusion.

FIG. 1 shows a configuration of a computing device for performing a method of neural network operations using a grid generator in accordance with the present disclosure.

By referring to FIG. 1, the computing device 100 may include a pair detector 130, a grid generator 140, and a neural network 150. Functions of inputting and outputting various data and those of operating the various data of the pair detector 130, the grid generator 140, and the neural network 150 may be performed by a communication part 110 and a processor 120 therein respectively. But, in FIG. 1, detailed explanation on how the communication part 110 and the processor 120 are connected is omitted. In addition, the computing device may further include a memory 115 capable of storing computer readable instructions for performing following processes. As one example, the processor, the memory, a medium, etc. may be integrated with an integrated processor.

Above the configuration of the computing device 100 was explained. Below, the process for generating neural network outputs by using the grid generator 140 in accordance with the present disclosure will be explained.

Figure 2:
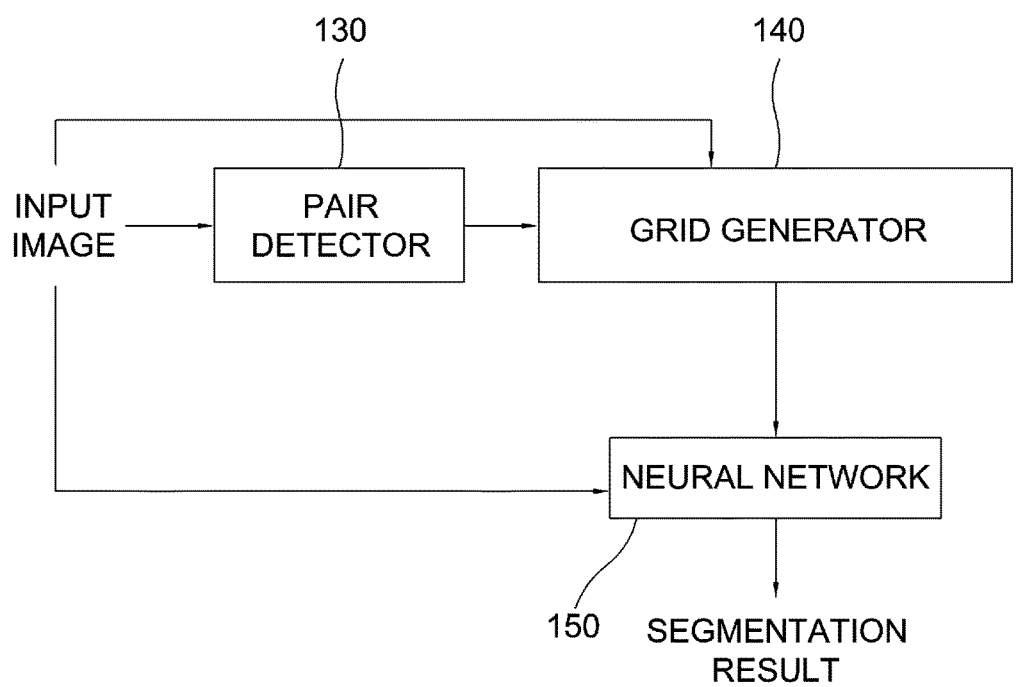
FIG. 2 shows processes for generating neural network outputs in accordance with the present disclosure.

FIG. 2 shows processes for generating the neural network outputs in accordance with the present disclosure.

By referring to FIG. 2, it can be seen that if a test image is acquired, processes may be performed by the pair detector 130, the grid generator 140, and the neural network 150 in the order thereof. To the pair detector 130, the test image may be inputted. And, to the grid generator 140, the test image and information on one or more locations of one or more pairs for testing, including objects for testing and non-objects for testing, generated by the pair detector 130 may be inputted. Finally, to the neural network 150, the test image, section information generated by the grid generator 140 and information on classes of the pairs for testing generated by the pair detector 130 may be inputted. Then, the neural network 150 may generate the neural network outputs by referring to parameters for testing which are determined by using the section information and the information on classes of the pairs for testing.

Specifically, if the test image representing road driving circumstances is acquired by the communication part 110, the computing device 100 may instruct the pair detector 130 to acquire the information on locations of the pairs for testing, including information on where pairs of the objects for testing and the non-objects for testing corresponding to the objects for testing are located in the test image, and information on classes of the pairs for testing by detecting the pairs for testing on the test image.

After the information on the locations of the pairs for testing and the information on classes of the pairs for testing are acquired, the computing device 100 may instruct the grid generator 140 to divide the test image into a plurality of subsections, and generate the section information, which includes information on the subsections for testing in the test image, by referring to the information on the locations of the pairs for testing. In some of the subsections, at least part of the pairs including objects for testing and non-objects for testing may exist, e.g., a pair of a car and a road. Herein, the grid generator 140 may divide the test image into the subsections by using a dynamic template.

Specifically, the grid generator 140 may manage information on the dynamic template, and the dynamic template may include at least part of (i) at least one first boundary in a first direction and (ii) at least one second boundary in a second direction, some of which are adjustable.

As one example, the first direction may be parallel to a horizontal axis of the test image and the second direction may be parallel to a vertical axis of the test image, but it may not be limited to these. Further, the first direction and the second direction may be diagonal directions or even curves determined by specific functions.

Otherwise, the dynamic template may include row groups and one or more column groups. As one example, the row groups may have an upper row group, a middle row group including at least part of the column groups, and a lower row group. The reason why the middle row group may include said at least part of the column groups is that many important objects exist generally in the center of the test image.

The configuration of the dynamic template may be predetermined as shown above. Herein, when the grid generator 140 divides the test image by using the dynamic template, the dynamic template may be provided by adjusting one or more boundaries included therein. As one example, the dynamic template may be provided such that at least one of the pairs for testing is included in each of said at least part of the subsections thereof. The section information may include information on locations of the adjusted boundaries.

On the other hand, the computing device 100 may instruct the grid generator to generate the section information by referring to information on the locations of the objects for testing. It may be generated in a similar way to the method shown above. For example, the dynamic template may be provided such that at least one of the objects for testing is included in each of said at least part of the subsections thereof. The information on the locations of the objects for testing may be also acquired in a similar way to the way that the information on locations of the pairs for testing is acquired.

After the section information is generated as shown above, the computing device 100 may instruct the neural network 150 to determine the parameters for testing.

In order to explain processes of determining the parameters for testing, processes of learning parameters for training of the neural network will be explained.

Before the test image is acquired by the communication part 110, the computing device 100 may have instructed the neural network 150 to learn the parameters for training by using information on each of pairs for training included in one or more training images. The pairs for training may include objects for training and non-objects for training. Each of the training images may include a typical arrangement which may appear in road driving circumstance. In order to explain the typical arrangement, FIG. 3 will be referred to.

Figure 3:
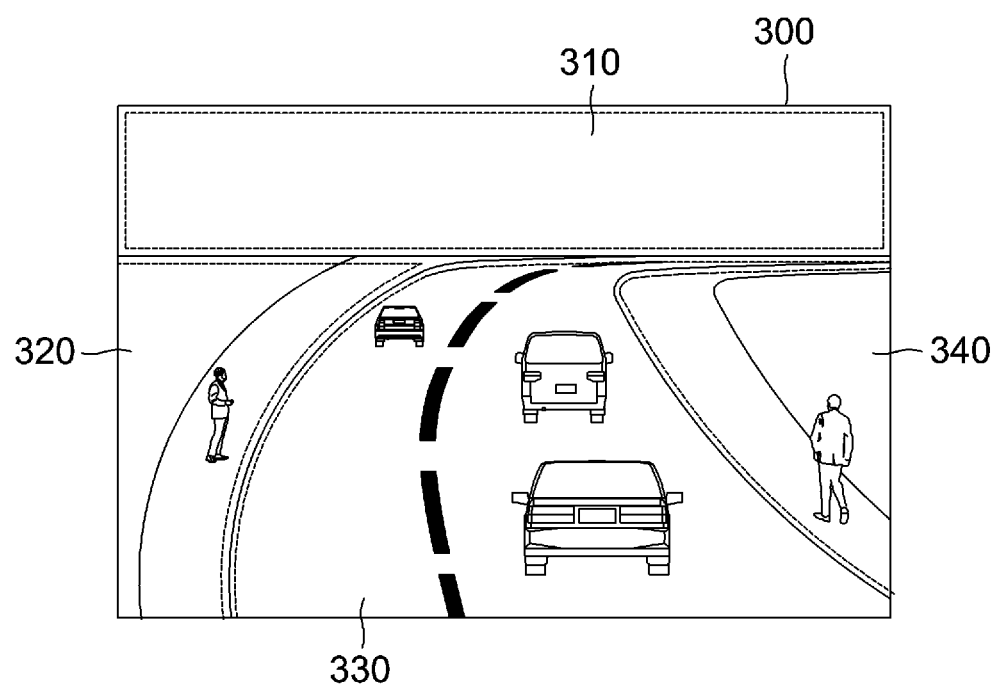
FIG. 3 shows a training image with a typical arrangement to be used for learning parameters of the neural network in accordance with the present disclosure.

FIG. 3 shows an example training image with the typical arrangement which have been used for learning the parameters for training of the neural network in accordance with the present disclosure.

By referring to FIG. 3, it can be seen that a road-car part is located in a center of the example training image 300, sidewalk-pedestrian parts are located in both sides thereof, and a sky part is located in an upper side thereof. The training images which have been used for learning parameters of the neural network 150 may be similar to the example training image 300.

In order to explain a configuration of the example training image 300, terms of partial area and location information for training will be explained.

The partial areas may be areas where the non-objects for training is located. For example, each of the partial areas may be each of areas in which each of the road-car part, the sidewalk-pedestrian parts, and the sky part is located. The location information for training may include information on coordinates of centers of the partial areas.

Herein, on condition that there are first location information to k-th location information corresponding to the first partial area to the k-th partial area in each of the training images, the training images, in which respective relative variations of at least part of the first location information to the k-th location information are equal to or smaller than a predetermined threshold value, may be selected to be used for the process of learning.

In the process of learning, the neural network 150 may not have learned the parameters for training by using entire area included in each of the training images. Rather, the neural network 150 may have learned the parameters for training by using information on each of the pairs for training included in each of at least part of partial areas, from a first partial area to a k-th partial area, included in the training images, and have stored class information on the pairs for training coupled with their corresponding parameters for training.

For example, assume that the neural network 150 has learned the parameters for training by using a plurality of training images such as the example training image shown in FIG. 3. In this case, a first partial area 310 may be the sky part, a second partial area 320 may be a left sidewalk-pedestrian part, a third partial area 330 may be the road-car part, and a fourth partial area 340 may be a right sidewalk-pedestrian part. Herein, the neural network 150 may have learned parameters for training corresponding to the road-car part by using the third partial area 330 and store class information on a pair for training, including the road and a car, coupled with the parameters for the corresponding road-car part. Similarly, in case of determining some part of the parameters for training corresponding to the sidewalk-pedestrian parts, the second partial area 320 and the fourth partial area 340 may have been used, and class information on a pair for training, including the sidewalk and pedestrians, may have been stored.

Above the learning process of the neural network 150 was explained. Below the process of determining the parameters for testing will be explained.

After the learning process of the neural network 150 has been completed, the parameters for training and the class information on their corresponding pairs may be stored. Then, if the test image is acquired by the communication part 110 and the processes performed by the pair detector 130 and the grid generator 140 are completed, the computing device 100 may instruct the neural network 150 to determine the parameters for testing by referring to parameters for training which have been learned by using information on the pairs for training whose corresponding class information is same as or similar to that on the pairs for testing.

Herein, the parameters for testing may be used for applying the neural network operations to each of said at least part of the subsections including each of the pairs for testing, by referring to parameters for training which have been learned by using information on pairs for training whose corresponding class information is same as or similar to that on the pairs for testing.

For this process, the neural network 150 may use information on each of the pairs including the objects for testing and the non-objects for testing included in each of said at least part of the subsections acquired by the pair detector 130.

For example, assume that specific parameters for training corresponding to the road-car part and the class information on the pair for training including the road and the car are stored together. In this case, if a specific pair for testing including the road and the car is determined to exist in a specific subsection in the test image, the specific parameters for testing are determined by using specific parameters for training having been learned by using information on pairs for training whose corresponding class information is same as or similar to that on the specific pair for testing.

In case there are only non-objects for testing in some of the subsections or there are only objects for testing in another some of the subsections, additional parameters for training, which have been learned by using the non-objects for training and the objects for training respectively, may be used for determining some of the parameters for testing to be applied to their corresponding subsections as shown above. Because the case as shown above is not a major issue in the present disclosure, detailed explanation on this case is omitted.

This method can be effective comparing to a conventional method in that the parameters for testing can be optimized, even though components of the pairs for testing appearing in the test image may be various. This advantage is owing to the method of determining the parameters for testing by using (i) class information on the pairs for testing and (ii) the parameters for training, corresponding to the class information on the pairs for testing, having been learned by using the pairs for training. For example, generally, a road (as a non-object for training) may correspond to a car (as an object for training) so that the CNN 200 may learn parameters for training by using the training images with the pairs for training similar to the example shown above, e.g., a pair of the road (as a non-object for training) and the car (as an object for training). By the conventional method, in case the pairs for testing are not common, e.g., the road (as a non-object for testing) and a pedestrian (as an object for testing), or a sidewalk (as a non-object for testing) and the car (as an object for testing), the parameters for testing may not be optimized, because the pairs for testing and the pairs for training are different. However, by using the method provided by the present disclosure, even in the uncommon cases as shown above, the parameters for testing can be optimized, because it can learn the parameters for training by using the training images with various pairs for training including the objects for training and the non-objects for training, and can determine the parameters for testing by using the class information on the pairs for training included in the testing image.

Also, this method can be effective comparing to the conventional method in that it can apply the proper parameters for testing even in case relative locations of the components included in the test image are different from those in the training image.

Specifically, the present disclosure may be most effective if the difference between the first location information to the k-th location information corresponding to a first partial area to a k-th partial area of the training image and those of the test image is larger than a second threshold value, but it may not be limited to this.

Figure 4A:
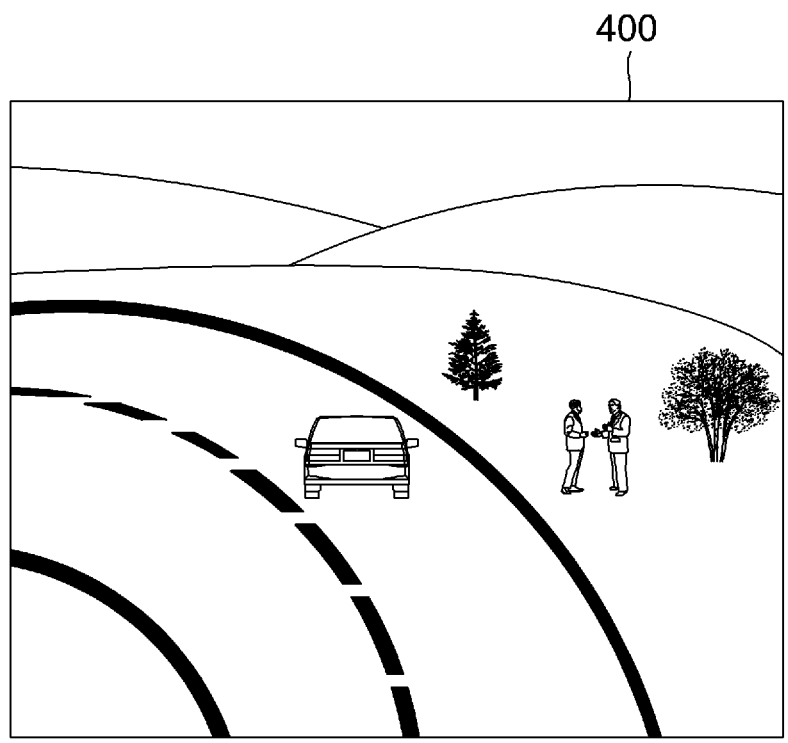
FIG. 4A shows a test image to which the method of neural network operation using the grid generator can be applied efficiently in accordance with the present disclosure.

FIG. 4A shows an example test image to which the method of the neural network operations using the grid generator can be applied efficiently in accordance with the present disclosure.

By referring to FIG. 4A, it can be seen that the road-car part is located on the left side, and the sidewalk-pedestrian part is located on the right side unlike FIG. 3. In this case, a result of the neural network operations generated by conventional methods may not be optimized. Because location of the road-car part included in the test image and that included in the training image are different. Thus, the parameters for testing may not be optimized. However, if the method of the present disclosure is applied to the test image corresponding to the case as shown above, optimized parameters can be applied to each of said at least part of subsections, so that optimized result of the neural network operations can be generated. It is shown in FIG. 4B.

Figure 4B:
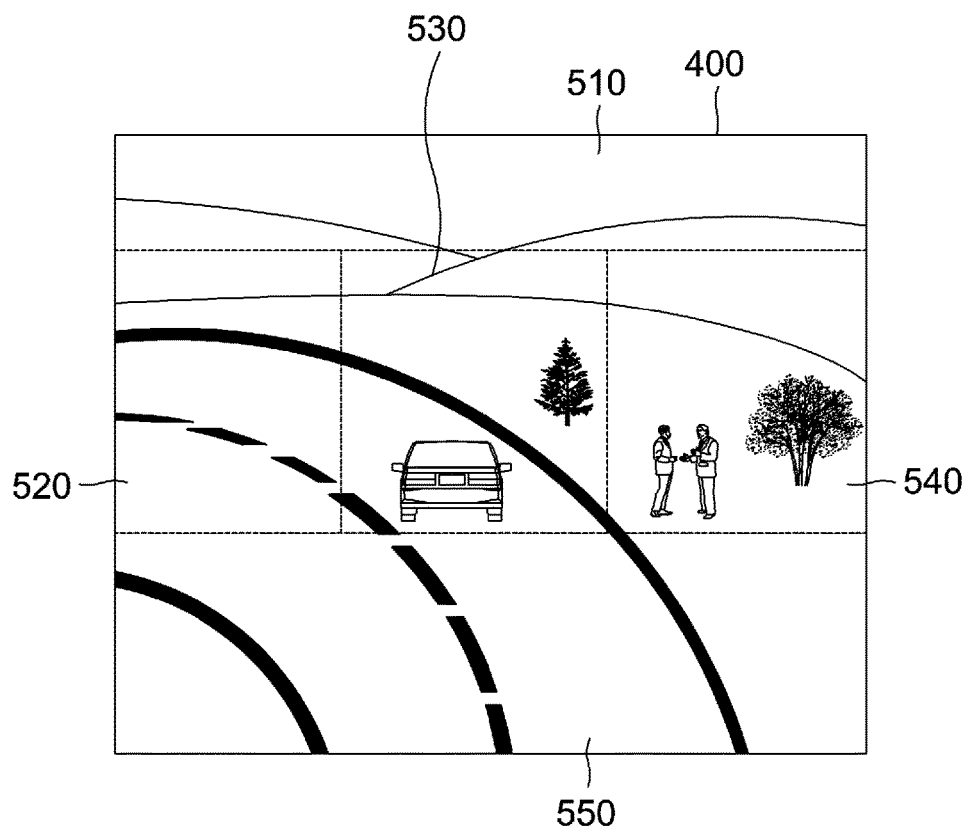
FIG. 4B shows a test image with subsections generated by a dynamic template in accordance with the present disclosure.

FIG. 4B shows an example test image with the subsections generated by the dynamic template in accordance with the present disclosure.

By referring to FIG. 4B, it can be seen that a subsection 530 for the road-car part on a center of the middle row, and a subsection 540 for the sidewalk-pedestrian part on a right side of the middle row are provided. Owing to the subsections, the parameters for training having been learned by using the road-car part included in the training image can be applied to the subsections 530, and those having been learned by using the sidewalk-pedestrian part included in the training image can be applied to the subsection 540.

Meanwhile, the parameters for testing can be determined by further referring to information on comparison between an area of a specific object for testing and an area of a specific non-object for testing included in a specific subsection.

In order to explain the processes for determining the parameters for testing as shown above, processes for learning the parameters for training will be explained.

For the processes for learning the parameters for training, the neural network 150 may learn the parameters for training corresponding to the specific subsection and store the information on classes of a specific pair for training, including the specific object for training and the specific non-object for training, by referring to information on comparison between an area of the specific object for training and that of the specific non-object for training, included in each of the partial areas, the first to the k-th partial areas. Accordingly, in case the area of the specific object for training is larger than that of the specific non-object for training, the neural network 150 may learn at least one first specific parameter for training, and store first information on classes, which corresponds to a case whose relative portion of corresponding specific object for training is large. In the opposite case, the neural network 150 may learn at least one second specific parameter for training, and store second information on classes, which corresponds to a case whose relative portion of corresponding specific object for training is small.

Herein, the first information on classes and the second information on classes are similar, but different in that ratios of the specific object for training to the specific non-object for training are different, one of them large, and the other small. For example, assume that there is a first pair for training, including a relatively large car (as an object for training) comparing to a corresponding road (as a non-object for training), and there is a second pair for training, including a relatively small car (as an object for training) comparing to a corresponding road (as a non-object for training). In this case, the first information on classes may correspond to the first pair, and the second information on classes may correspond to the second pair.

Specifically, on condition that the area of the specific object for testing is larger than that of the specific non-object for testing, which is included in the specific subsection along with the specific object for testing, the computing device 100 may determine the specific pair for testing, including the specific non-object for testing and the specific object for testing, as having the first information on classes, and instruct the neural network 150 to determine at least one specific parameter for testing among the parameters for testing, to be used for applying the neural network operations to the specific subsection, by referring to said at least one first specific parameter for training among the parameters for training.

On the contrary, on condition that the area of the specific object for testing is same as or smaller than that of the specific non-object, the computing device may determine the specific pair for testing as having the second information on classes, and instruct the neural network to determine at least one specific parameter for testing among the parameters for testing, to be used for applying the neural network operations to the specific subsection, by referring to at least one second specific parameter for training, among the parameters for training, whose corresponding information on classes is same as or similar to that of the specific pair for testing.

Because the parameters for training have been learned by referring to the pairs for training whose ratios between the non-objects for testing and the objects for testing included in the same subsections are various, it will be efficient to determine the parameters for testing by using information on comparison between an area of the objects for training and an area of the non-objects for training included in the same subsections. For example, assume a case that there are some of the parameters for training, including first parameters for training learned by using a first pair for training whose area of corresponding object for training is larger than that of corresponding non-object for training, and second parameters for training learned by using a second pair for training whose area of corresponding object for training is same as or smaller than that of corresponding non-object for training, and an area of an example object for testing is larger than that of an example non-object for testing, which is included in an example pair for testing along with the example object for testing in the test image. In this case, it will be natural to refer to the first parameters to determine some of the parameters for testing to be used for the example pair for testing.

After the parameters for testing are determined as shown above, the neural network operations may be applied to the test image. Herein, the neural network operations may be convolutional operations and deconvolutional operations. Accordingly, the computing device 100 may instruct the neural network 150 to generate the neural network outputs by applying the one or more convolutional operations and the one or more deconvolutional operations to the test image with the parameters for testing.

It is an advantage of the present disclosure to provide a method for determining the parameters for testing by using information on the pairs for training included in the subsections whose corresponding information on classes is same as or similar to that on the pairs for testing to thereby generate the optimized neural network outputs.

The aforementioned method can be provided for converting modes according to classes of areas in an image to satisfy level 4 of autonomous vehicles.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for neural network operations by using a grid generator, comprising steps of:
   (a) a computing device, if a test image is acquired, instructing a pair detector to acquire information on locations and classes of one or more pairs for testing by detecting the pairs for testing, including objects for testing and non-objects for testing corresponding to the objects for testing, on the test image;
   (b) the computing device instructing the grid generator to generate section information, which includes information on a plurality of subsections in the test image, by referring to the information on the locations of the pairs for testing;
   (c) the computing device instructing a neural network to determine parameters for testing, to be used for applying the neural network operations to each of at least part of the subsections including each of the pairs for testing, by referring to parameters for training which have been learned by using information on pairs for training whose corresponding information on the classes is same as or similar to that on the pairs for testing; and
(d) the computing device instructing the neural network to apply the neural network operations to the test image by using each of the parameters for testing, corresponding to each of said at least part of the subsections, to thereby generate one or more neural network outputs.

2. The method of claim 1, wherein, at the step of (b), the grid generator divides the test image by using a dynamic template, and wherein the dynamic template is provided by adjusting one or more boundaries included therein, such that (i) at least one of the pairs for testing is included in each of said at least part of the subsections of the dynamic template.

3. The method of claim 2, wherein the grid generator manages information on the dynamic template, and wherein the dynamic template includes at least part of (i) at least one first boundary in a first direction and (ii) at least one second boundary in a second direction, some of which are adjustable.

4. The method of claim 2, wherein the dynamic template includes row groups and one or more column groups, wherein the row groups have an upper row group, a middle row group including at least part of the column groups, and a lower row group, and wherein (i) at least one of the pairs for testing is included in each of said at least part of the subsections formed by the row groups and the column groups.

5. The method of claim 1, before the step (a), comprising a step of:
(a0) the computing device instructing the neural network to learn the parameters for training by using information on each of the pairs for training included in one or more training images.

6. The method of claim 5, wherein, at the step of (a0), the neural network learns the parameters for training by using information on each of the pairs for training included in each of at least part of partial areas, from a first partial area to a k-th partial area, included in the training images, and store information on classes of the pairs for training coupled with their corresponding parameters for training.

7. The method of claim 6, wherein, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

8. The method of claim 6, wherein, at the step of (c), (i) on condition that area of a specific object for testing is larger than that of a specific non-object for testing, which is included in a specific subsection along with the specific object for testing, the computing device determines a specific pair for testing, including the specific non-object for testing and the specific object for testing, as having first information on classes, and instructs the neural network to determine at least one specific parameter for testing among the parameters for testing, to be used for applying the neural network operations to the specific subsection, by referring to at least one first specific parameter for training among the parameters for training and (ii) on condition that the area of the specific object for testing is same as or smaller than that of the specific non-object, the computing device determines a specific pair for testing, including the specific non-object for testing and the specific object for testing, as having second class information on classes and instructs the neural network to determine at least one specific parameter for testing among the parameters for testing, to be used for applying the neural network operations to the specific subsection, by referring to at least one second specific parameter for training among the parameters for training.

9. The method of claim 1, wherein, at the step of (d), the computing device instructs the neural network to generate the neural network outputs by applying one or more convolutional operations and one or more deconvolutional operations to the test image with the parameters for testing.

10. The method of claim 9, wherein the test image represents road driving circumstances, the objects for testing represent objects existing on a road, and the neural network outputs are used for autonomous driving.

11. A computing device for neural network operations by using a grid generator, comprising:
at least one memory that stores instructions; and
at least one processor configured to execute the instructions to: perform processes of (I) instructing a pair detector to acquire information on locations and classes of one or more pairs for testing by detecting the pairs for testing, including objects for testing and non-objects for testing corresponding to the objects for testing, on a test image, (II) instructing the grid generator to generate section information, which includes information on a plurality of subsections in the test image, by referring to the information on the locations of the pairs for testing, (III) instructing a neural network to determine parameters for testing, to be used for applying the neural network operations to each of at least part of the subsections including each of the pairs for testing, by referring to parameters for training which have been learned by using information on pairs for training whose corresponding information on the classes is same as or similar to that on the pairs for testing, and (IV) instructing the neural network to apply the neural network operations to the test image by using each of the parameters for testing, corresponding to each of said at least part of the subsections, to thereby generate one or more neural network outputs.

12. The computing device of claim 11, wherein, at the process of (II), the grid generator divides the test image by using a dynamic template, and wherein the dynamic template is provided by adjusting one or more boundaries included therein, such that (i) at least one of the pairs for testing is included in each of said at least part of the subsections of the dynamic template.

13. The computing device of claim 12, wherein the grid generator manages information on the dynamic template, and wherein the dynamic template includes at least part of (i) at least one first boundary in a first direction and (ii) at least one second boundary in a second direction, some of which are adjustable.

14. The computing device of claim 12, wherein the dynamic template includes row groups and one or more column groups, wherein the row groups have an upper row group, a middle row group including at least part of the column groups, and a lower row group, and wherein (i) at least one of the pairs for testing is included in each of said at least part of the subsections formed by the row groups and the column groups.

15. The computing device of claim 11, before the process (I), wherein the processor further performs a process of: (0)

instructing the neural network to learn the parameters for training by using information on each of the pairs for training included in one or more training images.

16. The computing device of claim 15, wherein, at the process of (0), the neural network learns the parameters for training by using information on each of the pairs for training included in each of at least part of partial areas, from a first partial area to a k-th partial area, included in the training images, and store information on classes of the pairs for training coupled with their corresponding parameters for training.

17. The computing device of claim 16, wherein, on condition that there are first location information to k-th location information corresponding to the first partial area to the k-th partial area in each of the training images, the training images, in which respective relative variations of at least part of the first location information to the k-th location information are equal to or smaller than a predetermined threshold value, are selected.

18. The computing device of claim 16, wherein, at the process of (III), (i) on condition that area of a specific object for testing is larger than that of a specific non-object for testing, which is included in a specific subsection along with the specific object for testing, the processor determines a specific pair for testing, including the specific non-object for testing and the specific object for testing, as having first information on classes, and instructs the neural network to determine at least one specific parameter for testing among the parameters for testing, to be used for applying the neural network operations to the specific subsection, by referring to at least one first specific parameter for training among the parameters for training and (ii) on condition that the area of the specific object for testing is same as or smaller than that of the specific non-object, the processor determines a specific pair for testing, including the specific non-object for testing and the specific object for testing, as having second class information on classes and instructs the neural network to determine at least one specific parameter for testing among the parameters for testing, to be used for applying the neural network operations to the specific subsection, by referring to at least one second specific parameter for training among the parameters for training.

19. The computing device of claim 11, wherein, at the process of (IV), the processor instructs the neural network to generate the neural network outputs by applying one or more convolutional operations and one or more deconvolutional operations to the test image with the parameters for testing.

20. The computing device of claim 19, wherein the test image represents road driving circumstances, the objects for testing represent objects existing on a road, and the neural network outputs are used for autonomous driving.

* * * * *